Patented Dec. 4, 1934

1,982,946

UNITED STATES PATENT OFFICE 1,982,946

ADHESIVE

Walter Bauer, Darmstadt, Germany, assignor, by mesne assignments, to Charles Lennig & Company, Inc., a corporation of Pennsylvania No Drawing. Application May 9, 1929, Serial No. 361,841. In Germany May 9, 1928

10 Claims. (Cl. 134—23.3)

My invention relates to adhesives.

I have discovered that polymeric acrylic acid esters, either alone or in combination with solvents, and if desired, with the addition of other suitable substances constitute an excellent adhesive.

Thus, for instance, by means of a ten per cent solution of the polymeric acrylic acid ester in acetone, paper or fabric can be firmly secured to metals.

In place of the solution, also thin sheets or films of the polymeric acrylic acid ester can be used. In that case, the thin sheet of the acrylic acid ester is placed between the paper, or fabric, and the metal, whereupon by the application of pressure and heat a strong adhesive effect is obtained.

I claim:

1. An adhesive substance comprising a polymeric acrylic acid ester.
2. An adhesive substance comprising a polymeric acrylic acid ester and a solvent.
3. An adhesive substance comprising a polymeric acrylic acid ester in the shape of a film.
4. An adhesive substance, comprising a polymeric acrylic acid ester and acetone.
5. A method of adhesively uniting materials which comprises placing between the materials a film comprising a polymeric acrylic acid ester, and subjecting the same to heat and pressure.
6. A method of adhesively uniting materials which comprises placing between the materials a film comprising a polymeric acrylic acid ester and a solvent, and subjecting the same to heat and pressure.
7. A method of adhesively uniting materials which comprises placing between the materials a film comprising a polymeric acrylic acid ester and acetone, and subjecting the same to heat and pressure.
8. A composite article comprising materials adhesively united to each other by a polymeric acrylic acid ester.
9. A composite article comprising materials in sheet form adhesively united to each other by a film of a polymeric acrylic acid ester.
10. A composite article comprising materials adhesively united to each other by a polymeric acrylic acid ester by the application of heat and pressure.

WALTER BAUER.